(12) United States Patent
Shi et al.

(10) Patent No.: US 11,883,742 B2
(45) Date of Patent: Jan. 30, 2024

(54) METHOD AND DEVICE FOR AUDIO GENERATION

(71) Applicant: BEIJING DAJIA INTERNET INFORMATION TECHNOLOGY CO., LTD., Beijing (CN)

(72) Inventors: Jian Shi, Beijing (CN); Xu Dai, Beijing (CN); Jiayun Li, Beijing (CN)

(73) Assignee: Beijing Dajia Internet Information Technology Co., Ltd., Beijing (CN)

( * ) Notice: Subject to any disclaimer, the term of this patent is extended or adjusted under 35 U.S.C. 154(b) by 304 days.

(21) Appl. No.: 17/375,192

(22) Filed: Jul. 14, 2021

(65) Prior Publication Data
US 2022/0016527 A1 Jan. 20, 2022

(30) Foreign Application Priority Data
Jul. 17, 2020 (CN) .......................... 202010692218.3

(51) Int. Cl.
*A63F 13/54* (2014.01)
*G06F 3/16* (2006.01)
*G10H 1/40* (2006.01)

(52) U.S. Cl.
CPC .............. *A63F 13/54* (2014.09); *G06F 3/165* (2013.01); *G10H 1/40* (2013.01); *A63F 2300/6063* (2013.01)

(58) Field of Classification Search
CPC .. A63F 13/54; A63F 2300/6063; G06F 3/165; G10H 1/40
USPC ......................................................... 463/42
See application file for complete search history.

(56) References Cited

U.S. PATENT DOCUMENTS

| 7,169,996 B2* | 1/2007 | Georges .................. G06F 3/165 84/609 |
| 7,174,510 B2* | 2/2007 | Salter ..................... G09B 15/04 715/709 |
| 7,690,993 B2 | 4/2010 | Totaka et al. |
| 8,444,464 B2* | 5/2013 | Boch ....................... A63F 13/46 463/7 |

(Continued)

FOREIGN PATENT DOCUMENTS

| CN | 108553898 A | 9/2018 |
| JP | 2001190835 A | 7/2001 |

(Continued)

OTHER PUBLICATIONS

Office Action for JP application 2021-117641 with English Translation, dated Aug. 30, 2022.

(Continued)

*Primary Examiner* — Allen Chan
(74) *Attorney, Agent, or Firm* — Harter Secrest & Emery LLP; Timothy W. Menasco, Esq.

(57) ABSTRACT

The present disclosure relates to a method and device for audio generation. The method includes: obtaining a target rhythm, a target verse melody and a target chorus melody; configuring the target rhythm as a first audio track, the target verse melody as a second audio track, and the target chorus melody as a third audio track; generating a target audio by aligning start playing time of the first audio track, the second audio track and the third audio track to beat occurrence time of a first beat, a second beat and a third beat in a first metronome data respectively.

20 Claims, 6 Drawing Sheets

(56) References Cited

U.S. PATENT DOCUMENTS

| | | | |
|---|---|---|---|
| 8,629,342 B2* | 1/2014 | Lee | G10H 3/186 |
| | | | 84/610 |
| 9,646,587 B1* | 5/2017 | Becker | G10H 1/0025 |
| 9,857,934 B2* | 1/2018 | Humphrey | G06F 3/0481 |
| 2001/0007824 A1 | 7/2001 | Fukuda | |
| 2010/0184497 A1* | 7/2010 | Cichowlas | G10H 1/342 |
| | | | 463/31 |
| 2015/0031454 A1* | 1/2015 | Decker | G07F 17/3202 |
| | | | 463/35 |
| 2018/0315452 A1 | 11/2018 | Shi et al. | |
| 2020/0043453 A1 | 2/2020 | Lang et al. | |

FOREIGN PATENT DOCUMENTS

| | | | |
|---|---|---|---|
| JP | 2004325984 A | 11/2004 | |
| JP | 2005321514 A | 11/2005 | |

OTHER PUBLICATIONS

China National Intellectual Property Administration, Office Action issued in Chinese patent application No. 202010692218.3, dated May 8, 2023.

\* cited by examiner

METHOD AND DEVICE FOR AUDIO GENERATION

CROSS-REFERENCE TO RELATED APPLICATION

The present application is based upon and claims priority to Chinese Patent Application No. 202010692218.3, filed on Jul. 17, 2020, the entirety contents of which are incorporated herein by reference.

FIELD

The present disclosure relates to the field of computer technology, and in particular to a method and device for audio generation.

BACKGROUND

With the continuous development of Internet technology, in order to increase the entertainment life of users, various electronic games applied to electronic devices have gradually become more abundant. Some background music may be set for the game to increase the player's gaming experience.

SUMMARY

The present disclosure provides a method and device for audio generation and a storage medium.

According to embodiments of the present disclosure, a method for audio generation is provided. The method includes: obtaining a target rhythm, a target verse melody and a target chorus melody, in which the target rhythm is corresponding to a target game scene, and the target verse melody and the target chorus melody are respectively corresponding to at least one of the target game scene and data of behavior state of a player character; configuring the target rhythm as a first audio track, the target verse melody as a second audio track, and the target chorus melody as a third audio track; generating a target audio by aligning start playing time of the first audio track, the second audio track and the third audio track to beat occurrence time of a first beat, a second beat and a third beat in a first metronome data respectively, in which the first metronome data comprises a first offset, and occurrence time of each beat in the first metronome data is determined based on a first reference time and the first offset.

According to embodiments of the present disclosure, a device for audio generation is provided. The device includes: a processor; a memory for storing executable instructions of the processor; in which the processor is configured to performing acts of: obtaining a target rhythm, a target verse melody and a target chorus melody, in which the target rhythm is corresponding to a target game scene, and the target verse melody and the target chorus melody are respectively corresponding to at least one of the target game scene and data of behavior state of a player character; configuring the target rhythm as a first audio track, the target verse melody as a second audio track, and the target chorus melody as a third audio track; generating a target audio by aligning start playing time of the first audio track, the second audio track and the third audio track to beat occurrence time of a first beat, a second beat and a third beat in a first metronome data respectively, in which the first metronome data comprises a first offset, and occurrence time of each beat in the first metronome data is determined based on a first reference time and the first offset.

According to embodiments of the present disclosure, a non-transitory computer-readable storage medium is provided. The storage medium has instructions stored thereon, and when instructions are executed by a processor of a server, the server is caused to execute a method for audio generation, and the method includes: obtaining a target rhythm, a target verse melody and a target chorus melody, in which the target rhythm is corresponding to a target game scene, and the target verse melody and the target chorus melody are respectively corresponding to at least one of the target game scene and data of behavior state of a player character; configuring the target rhythm as a first audio track, the target verse melody as a second audio track, and the target chorus melody as a third audio track; generating a target audio by aligning start playing time of the first audio track, the second audio track and the third audio track to beat occurrence time of a first beat, a second beat and a third beat in a first metronome data respectively, in which the first metronome data comprises a first offset, and occurrence time of each beat in the first metronome data is determined based on a first reference time and the first offset.

It should be understood that the above general description and the following detailed description are only exemplary and explanatory, and cannot limit the present disclosure.

BRIEF DESCRIPTION OF THE DRAWINGS

The drawings here are incorporated into the specification and constitute a part of the specification, show embodiments conforming to the disclosure, and together with the specification are used to explain the principle of the disclosure, and do not constitute an improper limitation of the disclosure.

DETAILED DESCRIPTION

Figure 1:
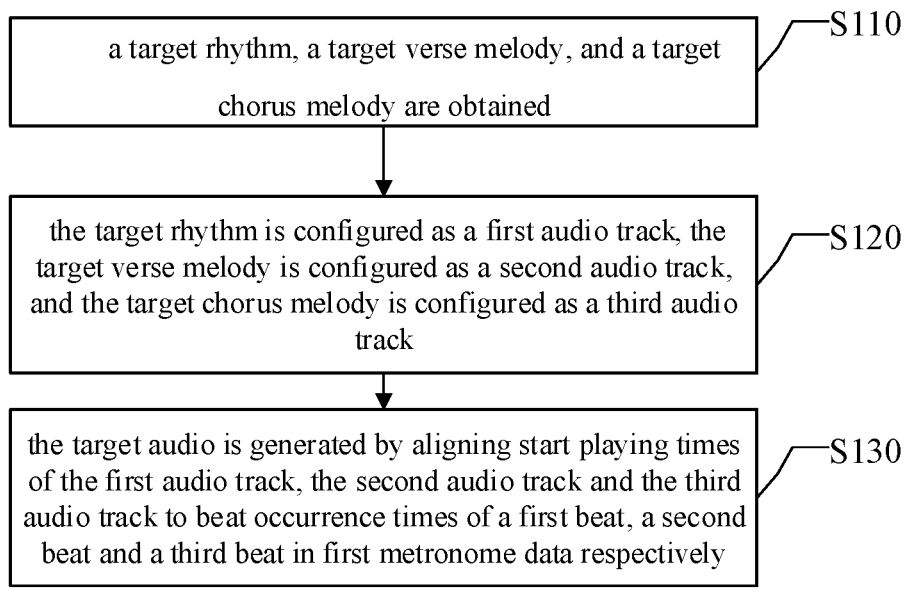
FIG. 1 is a schematic flowchart of a method for audio generation according to an exemplary embodiment.

In order to enable those skilled in the art to understand the technical solutions of the present disclosure, reference will be made clearly and completely technical solutions in the embodiments of the present disclosure with accompanying drawings.

It should be noted that the terms "at least one of A and B" and "A and/or B" in the specification and claims of the present disclosure may be interchangeable, which means A, or B, or both A and B. It should be noted that terms "first" and "second" in the specification and claims of the present disclosure and the accompanying drawings are used to distinguish similar objects, rather than to describe a specific order or sequence. It should be understood that data used in such a manner may be interchanged under appropriate circumstances so that embodiments of the present disclosure described herein may be implemented in a sequence other than the sequence illustrated or described herein. The implementations described in the following exemplary embodiments do not represent all implementations consistent with the present disclosure; instead, the implementations described in the following exemplary embodiments are merely examples of an apparatus and method consistent with the attached claims and some aspects of the present disclosure.

With the continuous development of Internet technology, various electronic games used to enrich the entertainment life of users have also been continuously developed. In order to increase the player's gaming experience, some background music is usually set for the game.

For example, in some rhythm games, different background music is usually designed for different game scenes. In view of the variety of game scenes, and each background music is played in a single thread, when multiple background music needs to be switched in a more complex game scene, it is often necessary to store multiple music in the video game in advance. Will cause the storage space occupied by video games to be larger.

As an example, in related technologies, in order to increase the game experience of the player, the player often uses music with a more intense rhythm when transaction scenes, and often uses some music with a slower rhythm when the player ends the battle. In this way, it is necessary to store at least two pieces of music in the video game in advance, one with a more intense rhythm and the other with a slow rhythm, which will cause multiple music to be pre-stored in the video game. The storage space occupied is relatively large.

To this end, the present disclosure provides a method for audio generation and apparatus, a server, and a storage medium to at least solve the problem of electronic games occupying relatively large storage space in the related art.

In the following, taking a rhythm game in a music type as a target game as an example, a method for audio generation provided by an embodiment of the present disclosure is introduced. The method for audio generation provided by the embodiments of the present disclosure not only can play different background music in different game scenes, but also try to avoid the problem of electronic games occupying a large storage space. In the method, a target rhythm (known as Beat) corresponding to a target game scene, and a target verse melody (known as Main) and a target chorus melody (known as Repeat) corresponding to the target game scene and/or behavior state data of a player character may be first obtained, and the target rhythm is configured as a first audio track, the target verse melody is configured as a second audio track, and the target chorus melody is configured as a third audio track, and finally start playing time of the first audio track, the second audio track and the third audio track are aligned to beat occurrence times of a first beat, a second beat and a third beat in first metronome data respectively, to generate the target audio.

Since the target audio includes three different audio tracks, when the target audio is played, the purpose of playing different background music can be achieved only by playing the audio of different audio tracks, so the present disclosure only needs one target audio to achieve playing multiple pieces of background music without pre-storing the multiple pieces of music, thereby making the storage space occupied by the electronic game smaller.

The method for audio generation provided by the present disclosure will be described in detail below with reference to FIG. 1 to FIG. 6.

As shown in FIG. 1, FIG. 1 is a schematic flowchart of a method for audio generation according to an exemplary embodiment. The method for audio generation includes steps 110 to 130, which are specifically described as follows. The steps of the method may be executed by a device for audio generation, the device may be provided as a server.

First, in 110, a target rhythm, a target verse melody, and a target chorus melody are obtained.

The target rhythm corresponds to the target game scene, and the target verse melody and the target chorus melody correspond to the target game scene and/or data of behavior state of the player character respectively.

In some embodiments of the present disclosure, the target rhythm is the audio that is played from the beginning of the game scene to the end after entering the game scene. For example, the target rhythm may be a set of drums played in a loop, which may be used to remind the player of the music rhythm in the game scene, so that the player can operate based on the music rhythm.

The target verse melody may start playing when the game scene is in progress, and stop playing when the playing duration reaches a preset duration. The preset duration may be a duration before the player enters a combat behavior state. The target chorus melody may be played in a loop until the game scene ends or the game scene is exited after the target verse melody ends.

It should be noted that the foregoing description of the playback sequence between the target verse melody and the target chorus melody is only an exemplary expression, and the present disclosure does not impose any limitation on it.

In some embodiments of the present disclosure, the target game scene may be a transaction scene, a casual scene, a chat scene, and so on. Each target game scene corresponds to a target rhythm, where multiple game scenes may share a target rhythm. For example, both the casual scene and the chat scene correspond to target rhythm A, and the transaction scene corresponds to target rhythm B.

Similarly, the transaction scene may correspond to the target verse melody A and the target chorus melody A, the casual scene corresponds to the target verse melody A and the target chorus melody B, and the chat scene corresponds to the target verse melody C and the target chorus melody B, etc.

In addition, the target verse melody and target chorus melody corresponding to the data of behavior state of the player character may also be obtained. The data of behavior state of the player character may be a combat behavior state of the player character, an exploration behavior state of the player character, and so on. For example, the combat behavior state of the player character corresponds to the target verse melody A and the target chorus melody A, and the exploration behavior state of the player character corresponds to the target verse melody A and the target chorus melody B.

Next, in 120, the target rhythm is configured as a first audio track, the target verse melody is configured as a second audio track, and the target chorus melody is configured as a third audio track.

The first audio track, the second audio track, and the third audio track are different.

Figure 2:
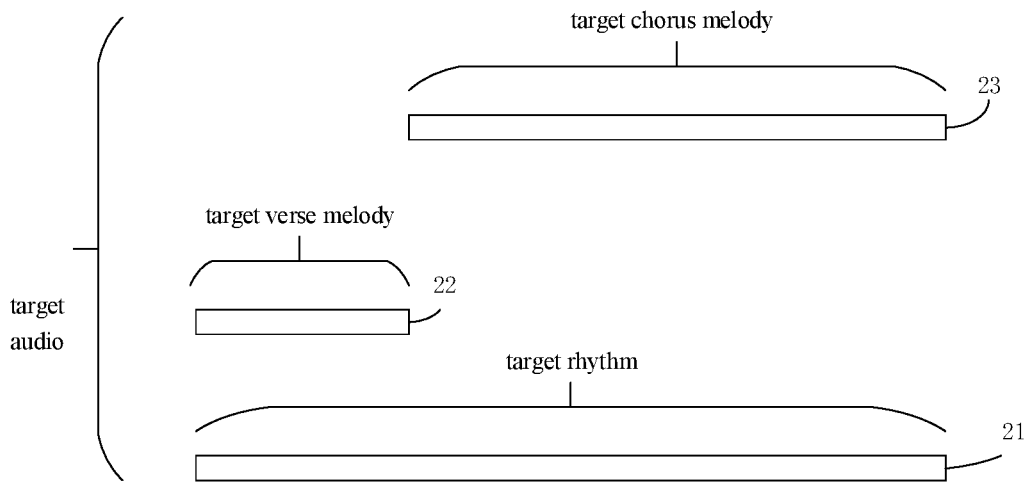
FIG. 2 is a schematic diagram showing an audio track configuration according to an exemplary embodiment.

In some embodiments of the present disclosure, it may be as shown in FIG. 2, which is a schematic diagram showing an audio track configuration according to an exemplary embodiment. As shown in FIG. 2, the target rhythm is configured as the first audio track 21; the target verse melody is configured as the second audio track 22; and the target chorus melody is configured as the third audio track 23.

Next, in 130, a target audio is generated by aligning start playing time of the first audio track, the second audio track and the third audio track to beat occurrence times of a first beat, a second beat and a third beat in first metronome data respectively.

The first metronome data includes a first offset, and the occurrence time of each beat in the first metronome data is determined based on the first reference time and the first offset.

In some embodiments of the present disclosure, during the opening process of the game, the Lua 5.1 development language can be used to establish metronome data in the Unity game engine. The reference time may be the system time of the client terminal of the target game. For example, the first offset included in the first metronome data is 0.5 seconds, and if the system time (reference time) of the client of the target game is 10:00, then the occurrence times of the beats can be sequentially determined as 10:00:05, 10:01:00, 10:01:05 and so on.

The above-mentioned specific implementations of step 110 and step 130 will be described in detail below through specific examples.

In the embodiment of the present disclosure, the target rhythm corresponding to the target game scene and the target verse melody and target chorus melody corresponding to the target game scene and/or the data of behavior state of the player character are first acquired, and then the target rhythm and target verse melody and the target chorus melody are configured as different audio tracks, and the first, second, and third audio tracks are obtained; finally, start playing time of the first audio track, the second audio track and the third audio track are aligned to beat occurrence times of a first beat, a second beat and a third beat in first metronome data respectively, to generate the target audio.

Since the target audio includes three different audio tracks, when the target audio is played, it is only necessary to play different audio tracks to achieve the purpose of playing different background music. Therefore, the present disclosure only needs one target audio to achieve playing of background music without storing multiple pieces of music in advance, thereby making the storage space occupied by the electronic game smaller.

The above step 110 is introduced below through FIG. 3 and specific examples.

In some embodiments of the present disclosure, in order to increase the richness of background music, it is also possible to generate different background music every time the player plays the same game scene. Please refer to FIG. 3 for details.

Figure 3:
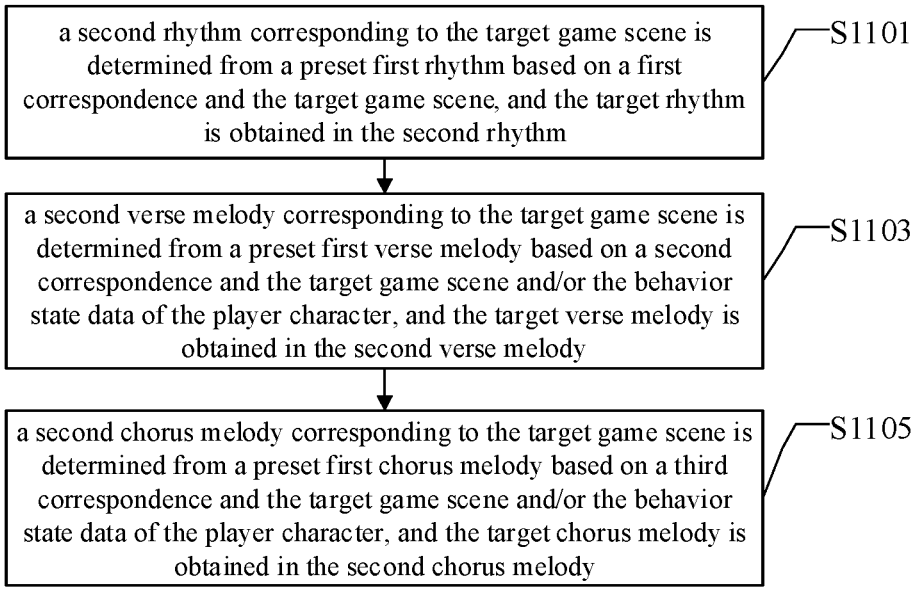
FIG. 3 is a schematic flowchart of a method for audio generation based on obtaining rhythm and melody according to an exemplary embodiment.

As shown in FIG. 3, FIG. 3 is a schematic flowchart of a method for audio generation based on acquiring rhythm and melody according to an exemplary embodiment. In some embodiments of the present disclosure, the step 110 may further include the following steps:

In 1101, a second rhythm corresponding to the target game scene is determined from a preset first rhythm based on a first correspondence and the target game scene, and the target rhythm is obtained in the second rhythm.

The first rhythm includes at least one second rhythm; the first correspondence is the correspondence between the game scene and the rhythm data.

In 1103, a second verse melody corresponding to the target game scene is determined from a preset first verse melody based on a second correspondence and the target game scene and/or the data of behavior state of the player character, and the target verse melody is obtained in the second verse melody.

The first verse melody includes at least one second verse melody; the second correspondence is the correspondence between a verse melody and at least one of a game scene and/or a data of behavior state of the player character.

In 1105, a second chorus melody corresponding to the target game scene is determined from a preset first chorus melody based on a third correspondence and the target game scene and/or the data of behavior state of the player character, and the target chorus melody is obtained in the second chorus melody.

The first chorus melody includes at least one second chorus melody; the third correspondence is the correspondence between a chorus melody and at least one of the game scene and the data of behavior state of the player character.

Taking the target rhythm, the target verse melody, and the target chorus melody all corresponding to the target game scene as an example, the above steps 1101 to 1105 are described in detail.

First, the first rhythm, the first verse melody and the first chorus melody can be preset for the game scene of the electronic game. The first rhythm includes the second rhythm corresponding to the game scene, the first verse melody includes the second verse melody corresponding to the game scene, and the first chorus melody includes the second chorus melody corresponding to the game scene.

For example, the game scene includes a transaction scene and a casual scene. The preset first rhythm includes a second rhythm A corresponding to the transaction scene and a second rhythm B corresponding to the casual scene; the first verse melody includes a second verse melody A corresponding to the transaction scene and a second verse melody B corresponding to the casual scene; the first chorus melody includes the second chorus melody A corresponding to the transaction scene and the second chorus melody B corresponding to the casual scene.

In this way, when acquiring the target rhythm, if the target game scene is a transaction scene, a second rhythm corresponding to the transaction scene may be determined from the first rhythm as the second rhythm A, and in this way, the target rhythm may be obtained randomly from multiple rhythms in the second rhythm A.

Similarly, if the target game scene is a transaction scene, when the target verse melody is obtained, the second verse melody corresponding to the transaction scene is determined from the first verse melody as the second verse melody A, then the target verse melody may be obtained randomly from multiple verse melodies in the second verse melody A.

If the target game scene is a transaction scene, when acquiring the target chorus melody, the second chorus melody corresponding to the transaction scene may be determined from the first chorus melody as the second chorus melody A, and the target chorus melody may be obtained randomly from the multiple chorus melodies in the second chorus melody A.

Since in the above embodiment, the target rhythm, target verse melody, and target chorus melody are randomly obtained from the second rhythm, the second verse melody, and the second chorus melody corresponding to the target game scene each time, so that the different background music can be generated for player when the same game scene is played each time, which making the background music richer.

In some embodiments of the present disclosure, since the player character may appear in the transaction scene to trigger the player character's combat behavior state, but after the player character's combat behavior state ends, the player character still does not exit the transaction scene, but continues to perform an exploratory behavior in the transaction scene (such as picking up the battle reward in the transaction scene after the battle is over).

At this time, in order to make the background music also have changes in playback, it is possible to correspond the target verse melody and target chorus melody with the data of behavior state of the player character, so that the background music can be changed with the behavior state of the player character.

In the following, the target rhythm corresponds to the target game scene, the target verse melody and the target chorus melody correspond to the player character, and the above steps 1101 to 1105 are described in detail.

First, the first rhythm may be preset for the game scene of the electronic game, and the first verse melody and the first chorus melody may be set for the behavior state of the player character in the electronic game. The first rhythm includes the second rhythm corresponding to the game scene, the first verse melody includes the second verse melody corresponding to the behavior state of the player character, and the first chorus melody includes the second chorus melody corresponding to the behavior state of the player character.

For example, the game scene includes a transaction scene and a casual scene, and the behavior state of a player character includes a combat behavior state and an exploration behavior state.

In this way, the preset first rhythm includes the second rhythm A corresponding to the transaction scene and the second rhythm B corresponding to the casual scene; the first verse melody includes the second verse melody A corresponding to the combat behavior state and the second verse melody B corresponding to the exploration behavior state; the first chorus melody includes the second chorus melody A corresponding to the combat behavior state and the second chorus melody B corresponding to the exploration behavior state.

In this way, when acquiring the target rhythm, if the target game scene is a transaction scene, the second rhythm corresponding to the transaction scene is determined from the first rhythm as the second rhythm A, and then the target rhythm may be randomly obtained from multiple rhythms in the second rhythm A.

Similarly, if the behavior state of the player character at this time is the combat behavior state, when acquiring the target verse melody, the second verse melody corresponding to the combat behavior state is determined from the first verse melody as the second verse melody A, in this way, the target verse melody is randomly obtained from multiple verse melodies in the second verse melody A.

If the behavior state of the player character at this time is the combat behavior state, when obtaining the target chorus melody, the second chorus melody corresponding to the combat behavior state can be determined from the first chorus melody as the second chorus melody A. In this way, the target chorus melody may be randomly acquired from multiple chorus melodies in the second chorus melody A.

Because in the above embodiment, the target rhythm is randomly obtained in the second rhythm corresponding to the target game scene, and the target verse melody and the target chorus melody are obtained from the second verse melody and the second chorus melody corresponding to the data of behavior state of the player character, such that different background music may be generated when the player plays the same game scene, and the background music is different under the behavior of different player characters, which makes the generated background music richer.

In some other embodiments of the present disclosure, the rhythm corresponding to each game scene, the verse melody and the chorus melody corresponding to each game scene and/or the behavior state of the player character may also be preset.

Thus, when acquiring the target rhythm, the target verse melody and the target chorus melody, the rhythm corresponding to the target game scene in the preset rhythm is the target rhythm, and the verse melody and the chorus melody corresponding to the target game scene and/or the data of behavior state of the player character in the preset verse melody and chorus melody are the target verse melody and the target chorus melody. Thus, the target rhythm can be directly obtained from the preset rhythm, the target verse melody is obtained from the preset verse melody, and the target chorus melody is obtained from the preset chorus melody. In this way, the background music corresponding to the same game scene and/or the same player character's data of behavior state can be made the same, making the background music of the entire electronic game more concise.

In some embodiments of the present disclosure, the first beat in the first metronome data may include at least one sub beat, the second beat may include at least one sub beat, and the third beat may include at least one sub beat. The first audio track obtained through step 120 may include at least one rhythm segment, for example, two measures may be used as one rhythm segment; the second audio track obtained through step 120 may include at least one verse melody segment, for example, two measures or four measures are used as a verse melody segment; the third track obtained through step 120 may include at least one chorus melody segment, for example, two measures or four measures can be used as a chorus melody segment.

In this way, in some embodiments of the present disclosure, in order to prevent the generated target audio from incorrect beats, it is also necessary to set the start playing time of the first audio track, the second audio track, and the third audio track to be aligned with the beat occurrence times of the first beat, the second beat, and third beat in the metronome data. The above step 130 will be described in detail below with reference to FIG. 4 and FIG. 5 respectively.

Figure 4:
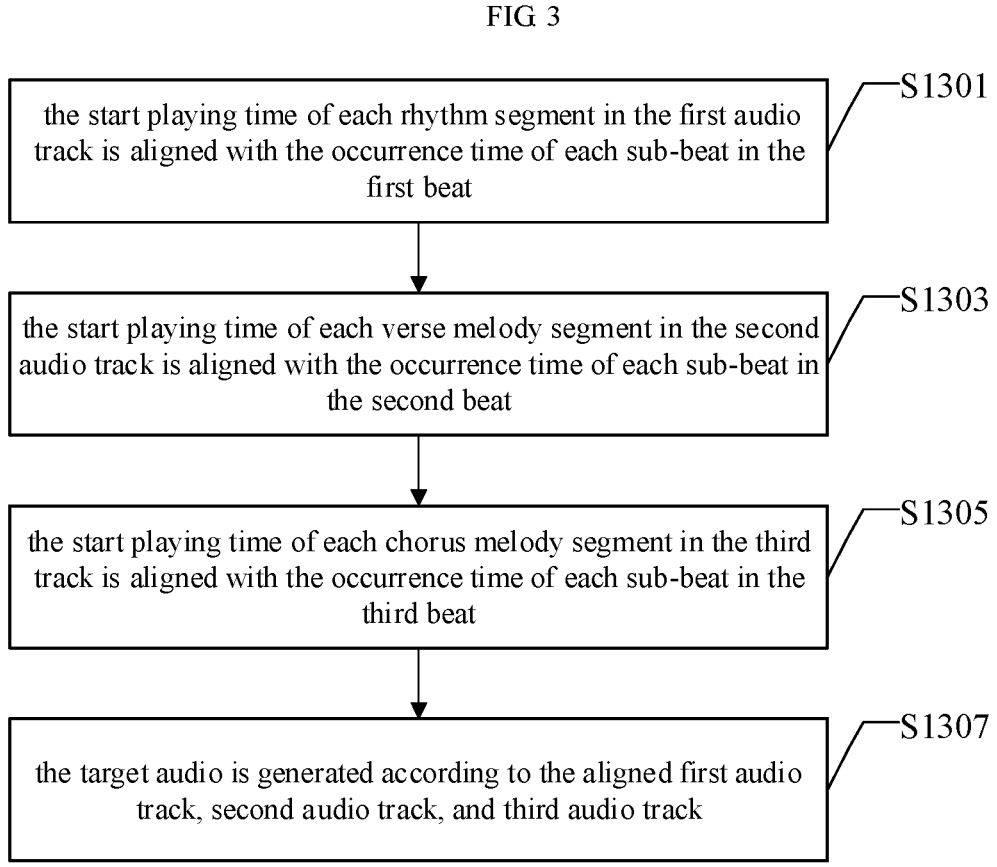
FIG. 4 is a schematic flowchart of a method for audio generation based on beat alignment according to an exemplary embodiment.

In some embodiments of the present disclosure, as shown in FIG. 4, FIG. 4 is a schematic flowchart of a method for audio generation based on beat alignment according to an exemplary embodiment.

As shown in FIG. 4, step 130 may further include the following steps.

In 1301, the start playing time of each rhythm segment in the first audio track is aligned with the occurrence time of each sub-beat in the first beat.

In 1303, the start playing time of each verse melody segment in the second audio track is aligned with the occurrence time of each sub-beat in the second beat.

In 1305, the start playing time of each chorus melody segment in the third track is aligned with the occurrence time of each sub-beat in the third beat.

In 1307, the target audio is generated based on the aligned first audio track, second audio track, and third audio track.

As an example, the first audio track includes at least one rhythm segment, each rhythm segment may be aligned with the beat occurrence time in the metronome every time it is played. For example, the first audio track includes a rhythm segment A and a rhythm segment B. The length of the rhythm segment A is 10 s. If the 100th second after the start of the game scene is the playing time of the rhythm segment A, at the 100th second, the rhythm segment A is aligned with the occurrence time of the beat in the first beat. Then, at the 110th second, the rhythm segment B is aligned with the occurrence time of the beat in the first beat again.

At this time, it should be noted that as long as the rhythm segment A and the rhythm segment B start to play at the time of the beat in the metronome at the same time, as to which beat the rhythm segment A and the rhythm segment B correspond to, there is no limitation here. The alignment method of the second audio track and the third audio track is the same as the alignment method of the first audio track, and will not be repeated here.

Figure 5:
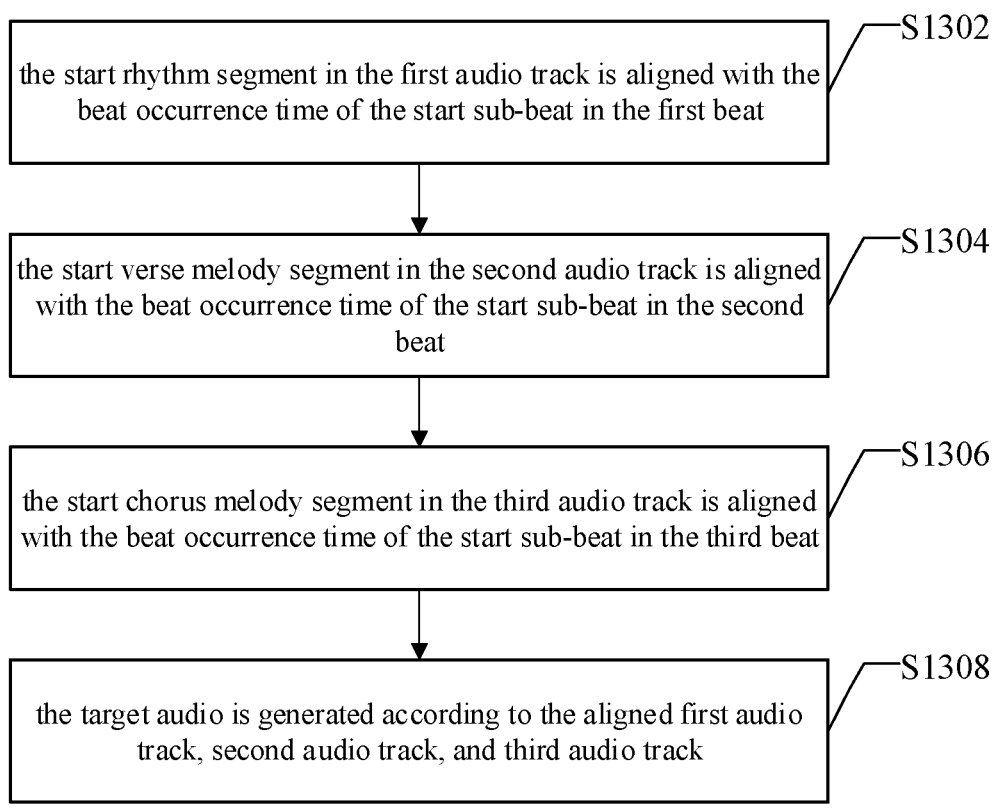
FIG. 5 is a schematic flowchart of a method for audio generation based on beat alignment according to another exemplary embodiment.

In other embodiments of the present disclosure, as shown in FIG. 5, FIG. 5 is a schematic flowchart of a method for audio generation based on beat alignment according to another exemplary embodiment.

As shown in FIG. 5, step 130 may further include the following steps.

In 1302, the start rhythm segment in the first audio track is aligned with the beat occurrence time of the start sub-beat in the first beat.

In 1304, the start verse melody segment in the second audio track is aligned with the beat occurrence time of the start sub-beat in the second beat.

In 1306, the start chorus melody segment in the third audio track is aligned with the beat occurrence time of the start sub-beat in the third beat.

In 1308, the target audio is generated based on the aligned first audio track, second audio track, and third audio track.

As an example, since the multiple segments included in each audio are played continuously, when the first, second, and third audio tracks are played, only the start segment of each audio is required to be aligned with the occurrence time of the beat in the first metronome.

Taking the first track including the rhythm segment A and the rhythm segment B (where the rhythm segment A occurs before the rhythm segment B, and the rhythm segment A is the starting rhythm segment) as an example, when playing the first track, it is only needed to change the start playing time of rhythm segment A to be aligned with the occurrence time of the start sub-beat in the first beat in the metronome, and the rhythm segment B will continue to be played cyclically after the playing of the rhythm segment A ends. For example, if the length of rhythm segment A is 10 seconds, the 100th second after the start of the game scene is the playing time of rhythm segment A, then at the 100th second, it is only needed to align the rhythm segment A with the occurrence time of the beat in the first beat. After the rhythm segment A is played at the 110th second, the rhythm segment B is continued to be played, without aligning start playing time of the rhythm segment B with the time when the beat occurrence time. Moreover, it should be noted that as long as the rhythm segment A starts to be played at the same time as the occurrence time of the beat in the metronome, as to which beat the rhythm segment A corresponds to, there is no limitation here. The alignment method of the second audio track and the third audio track is the same as the alignment method of the first audio track, which will not be repeated here.

In the embodiments of the present disclosure, the target audio is generated by aligning the start playing time of the first, second, and third audio tracks with the first, second, and third beats in the first metronome data, such that the generated target audio corresponds to the beat occurrence time of the metronome during playback, so as to prevent the target audio from incorrect beats during playback, so that the target audio has a better sense of rhythm.

In addition, considering that in the process of playing the target audio, there may be a situation where there may be a jam between the audio tracks due to hardware equipment or network reasons, so in some other embodiments of the present disclosure, during the playback of the target audio, the actual playback times of the first audio track, the second audio track, and the third audio track in the target audio are detected. For more details, please refer to FIG. 6.

Figure 6:
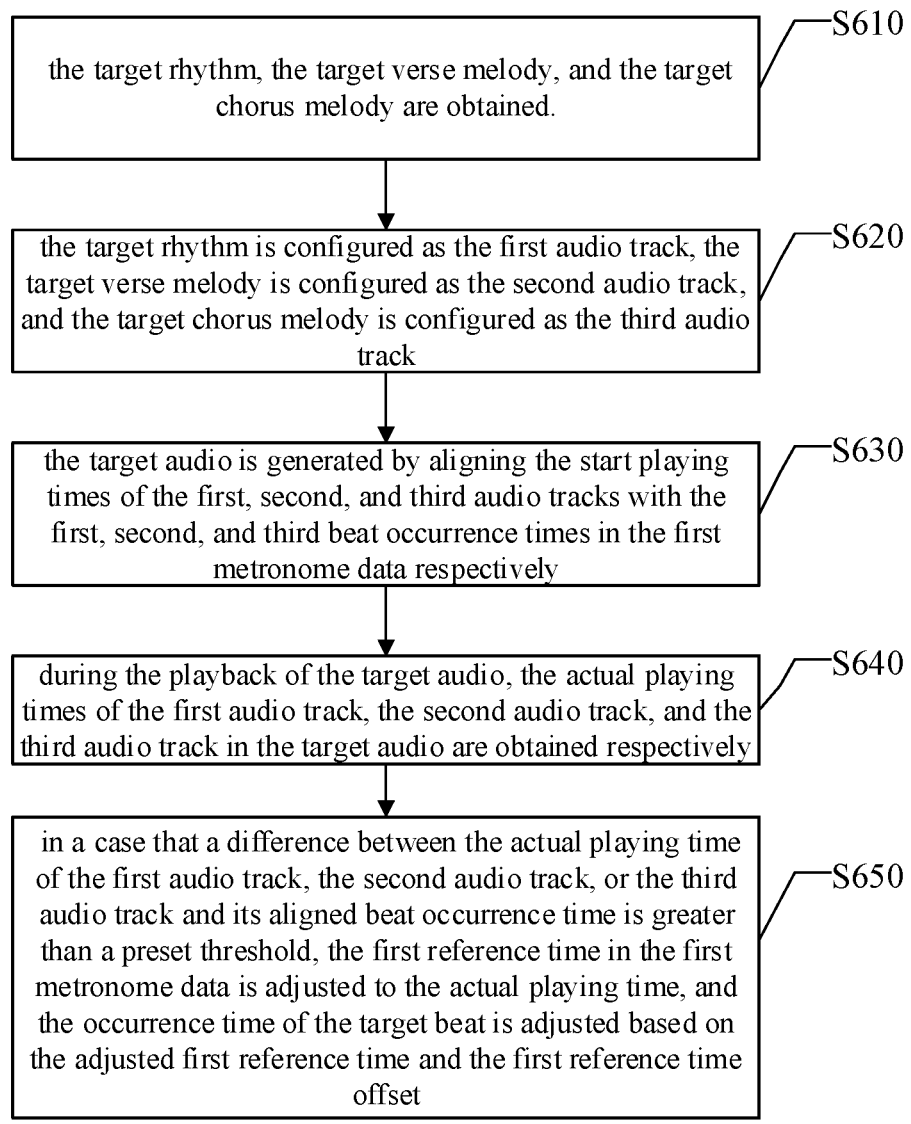
FIG. 6 is a schematic flowchart of a method for audio generation according to another exemplary embodiment.

FIG. 6 is a schematic flowchart of a method for audio generation according to another exemplary embodiment. As shown in FIG. 6, the method includes step 610 to step 650.

In 610, the target rhythm, the target verse melody, and the target chorus melody are obtained.

The target rhythm corresponds to the target game scene, and the target verse melody and the target chorus melody correspond to the target game scene and/or the data of behavior state of the player character respectively.

In 620, the target rhythm is configured as the first audio track, the target verse melody is configured as the second audio track, and the target chorus melody is configured as the third audio track.

The first audio track, the second audio track, and the third audio track are different.

In 630, the target audio is generated by aligning the start playing time of the first, second, and third audio tracks with the first, second, and third beat occurrence times in the first metronome data.

The first metronome data includes a first offset, and the occurrence time of each beat in the first metronome data is determined based on the first reference time and the first offset.

The above steps 610 to 630 are the same steps as the steps 110 to 130 shown in FIG. 1, which will not be repeated here.

In 640, during the playback of the target audio, the actual playing time of the first audio track, the second audio track, and the third audio track in the target audio are obtained respectively.

In the embodiments of the present disclosure, since the first audio track, the second audio track, and the third audio track in the target audio are on different audio tracks, when the target audio is played, the first audio track, the second audio track, and the third track will be played separately, without interfering with each other. Thus, when the target audio is played, the actual playing time of the first audio track, the second audio track, and the third audio track can be obtained.

In 650, in a case that a difference between the actual playing time of the first audio track, the second audio track, or the third audio track and its aligned beat occurrence time is greater than a preset threshold, the first reference time in the first metronome data is adjusted to the actual playing time, and the occurrence time of the target beat is adjusted based on the adjusted first reference time and the first offset.

The target beat is the beat that occurs after the actual playing time in the first metronome data.

In some embodiments of the present disclosure, if the first offset included in the first metronome data is 1 s and the reference time is 10:00:00, then the beat occurrence time of each beat in the first metronome should be 10:00:01, 10:00:02, 10:00:03, 10:00:04 and so on.

Taking the first audio track and the preset threshold being 0.1 s as an example, if the first audio track should be aligned with the beat occurrence time 10:00:02, but the actual playback time is 10:00:02:05, then it is known that the difference between the actual playback time of the first audio track and the aligned beat occurrence time is 0.5 s, which is greater than the preset threshold of 0.1 s. In this way, it can be understood that the audio playback is stuck at this time.

Therefore, for the next playback, the first track can be aligned with the beat occurrence time in the first metronome. At this time, the first reference time corresponding to the first metronome can be adjusted from 10:00:00 to 10:02:05, and then the target beat that originally needed to occur after 10:02:05 may be adjusted. That is, because the first reference time is adjusted from 10:00:00 to 10:02:05, the beat occurrence time of the target beat that originally needed to occur at 10:00:03 and 10:00:04 will be adjusted to 10:03:05 and 10:04:05 respectively based on the adjusted first reference time 10:02:05 and the first offset 1 s. In this way, next, the played first audio track may be aligned with the beat occurrence time in the first metronome again, so that when the target audio is played, it is possible to avoid the occurrence of wrong beats as much as possible.

In some embodiments of the present disclosure, in the Unity game engine, the playback progress of the audio track is measured by directly using the audio source time or the audio source time samples to play the track, so as to obtain accurate playback time. In addition, audio source play scheduled may be used to ensure that the music accurately falls on the beat.

In other embodiments of the present disclosure, the rhythm of the background music can also be adjusted based on the data of behavior state of the player. Specifically, after step 130, the method can further include the following steps: obtaining the first target data of behavior state of the player character; adjusting the first offset based on the first target data of behavior state and the fourth correspondence, in which the fourth correspondence is the correspondence between the data of behavior state of the player and the offset.

As an example, the first target data of behavior state may be the current behavior state of the player character, and the fourth correspondence may include: the combat behavior state corresponds to the offset A, the exploratory behavior state corresponds to the offset B, and so on. The shorter the offset, the tighter the rhythm.

In this way, after acquiring the first target data of behavior state of the player character, the beat speed can be adjusted based on the behavior state of the player character, so that the rhythm of the background music can be changed with the behavior state of the player character. In addition, after adjusting the offset, it is still necessary to align the start playing time of the first, second, and third audio tracks with the occurrence time of the beat, so as to avoid wrong beats of the generated target audio as much as possible.

In other embodiments of the present disclosure, in order to be able to play specific background music based on the game scene and the data of behavior state of the player when the background music is played, so in other embodiments of the present disclosure, after step 130, The method may also include the following steps: during the playback of the target audio, obtaining a second target data of behavior state of the player character and game scene; in a case that the game scene is the target game scene and the second target data of behavior state meets the preset state, switching playing the target rhythm and the target chorus melody to playing the target rhythm and the verse melody.

In some embodiments of the present disclosure, the preset state may be an end combat behavior state, or an end exploration state, and so on.

In some game scenarios, the player character can trigger the player character's combat behavior state in the transaction scene, but after the player character's combat behavior state ends, the player character still does not exit the transaction scene, but continues to perform the exploration behavior in the transaction scene (for example, after the combat is over, picking up the battle reward in the transaction scene).

At this point, in order to be able to play the background music with a more intense rhythm in the transaction scene of the player character, and after the player character has not exited the transaction scene but ended the combat behavior state, the background music with a slower rhythm can be played. Therefore, during the playback of the target audio, the second target data of behavior state of the player character and the game scene are obtained.

The second target data of behavior state may be the current data of behavior state of the player character, and the acquired game scene may be the game scene where the player character is currently located.

If it is judged that the acquired game scene is still the target game scene (transaction scene), it indicates that the current player character has not exited or changed the game scene. At this time, it can be further judged whether the player character's second target data of behavior state meets the preset state (end combat state).

Next, after judging that the second target data of behavior state of the player character has met the preset state (i.e., the player character is in the end combat state), playing the target chorus melody in the target audio can be switched to playing the target verse melody.

For example, please continue to refer to FIG. 2, when the target audio is played, the target rhythm will start to play when entering the game scene and continue to play until the end of the game scene; when the player character enters the game scene but does not trigger the combat behavior state, the target verse melody may be played. Once the player character triggers the combat behavior state, the playback of the target verse melody may be ended and the target chorus melody is started to be played.

At this time, if the acquired second target data of behavior state of the player character satisfies the preset state (the end combat state), and the player character is still in the transaction scene, so, in order to make the background music corresponding to the behavior state of the player character, at this time, the volume of the target chorus melody originally played on the third track can be muted, so that the target chorus melody on the third track does not emit sound, and the target verse melody is invoked to be played to switch playing the target chorus melody to playing the verse melody.

In addition, it is also possible to directly pause the target chorus melody and directly invoke the target verse melody to play.

In the embodiments of the present disclosure, by presetting the preset state and acquiring the second target data of behavior state of the player character and game scene, even if the player character does not change the game scene, the playback of the target chorus melody may be switched to playing the verse melody in a case that the corresponding second target data of behavior state meets the present state, such that the background music playback can change with the behavior state of the player character, and there is no need to pre-store multiple music files, and only one target audio is needed to play different background music in different states, thus making the storage space occupied by electronic games smaller.

In some other embodiments of the present disclosure, the player may also upload background music by himself, and the electronic game may adjust the target object in the target game scene to perform actions based on the music uploaded by the player himself. Specifically, after step 130, the method may also include: receiving an uploaded music; identifying the second beat data corresponding to the music; controlling the target object in the target game scene to execute the target action based on the occurrence time of each beat in the second beat data.

The second beat data includes a second offset, and the occurrence time of each beat in the second metronome data is determined based on the second reference time and the second offset.

In some embodiments of the present disclosure, the target object may be at least one of a non-game character, a game scene, and a game special effect. Game characters can be player characters or non-player characters; game visual effects can be light and shadow effects in the game, player character skill effects, waterfalls in the scene, fallen leaves, etc.; game scene elements may be decorations used to decorate the game scene in the game scene, such as lanterns, trees, kites, etc.

As an example, the player can upload music by himself. After receiving the uploaded music, the apparatus for audio generation can identify the second metronome data corresponding to the uploaded music through algorithms such as music melody extraction (Audio Finger printer). The second metronome data includes a second offset, and the occurrence time of each beat in the second metronome data is determined based on the second reference time and the second offset.

In this way, after the second metronome data is identified, at least one of the non-game character, the game scene, and the game special effects in the target game scene can be controlled to execute the target action based on the occurrence time of each beat in the second beat data.

In the embodiment of the present disclosure, by identifying the second beat data corresponding to the uploaded music and controlling the target object in the target game scene, the target action can be executed based on the occurrence time of each beat in the second beat data, thereby making the background music of the electronic game can be adjusted autonomously based on the player's preferences, and the electronic game controls the target object in the target game scene to execute the target action based on the time when the second metronome data of the uploaded music occurs. It can also make the action of the target object in the target game scene adapting to the beat, making the target game scene more rhythmic.

It should be noted that the execution subject of the control method provided by the above-mentioned embodiments of the present disclosure may be a device for audio generation, or a module for audio generation in the device for audio generation for executing the method for audio generation.

Hereinafter, taking the device for audio generation that loads the method for audio generation provided in the foregoing embodiment as an example, the device for audio generation that implements the loaded the method for audio generation provided by the embodiments of the present disclosure is described.

Figure 7:
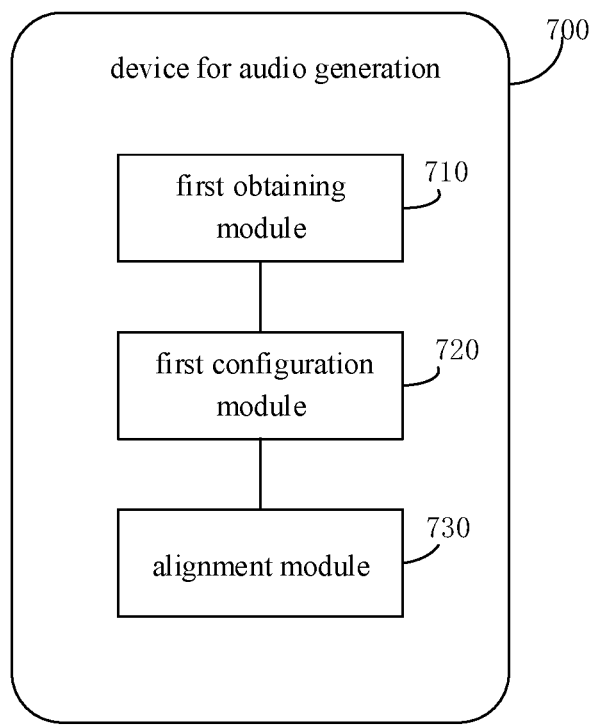
FIG. 7 is a block diagram showing a device for audio generation according to an exemplary embodiment.

FIG. 7 is a block diagram showing a device for audio generation according to an exemplary embodiment. The device 700 for audio generation specifically includes: a first obtaining module 710, configured to obtain a target rhythm, a target verse melody and a target chorus melody, in which the target rhythm corresponds to a target game scene, and the target verse melody and the target chorus melody respectively correspond to the target game scene and/or data of behavior state of a player character respectively; a first configuration module 720, configured to configure the target rhythm as a first audio track, the target verse melody as a second audio track, and the target chorus melody as a third audio track; an alignment module 730, configured to generate target audio by aligning start playing time of the first audio track, the second audio track, and the third audio track respectively to beat occurrence times of a first beat, a second beat, and a third beat in first metronome data, in which the first metronome data includes a first offset, and an occurrence time of each beat in the first metronome data is determined based on a first reference time and the first offset.

In the embodiment of the present disclosure, the target rhythm corresponding to the target game scene and the target verse melody and target chorus melody corresponding to the target game scene and/or the data of behavior state of the player character are first acquired, and then the target rhythm and target verse melody and the target chorus melody are configured as different tracks, and the first, second, and third tracks are obtained; finally, the target audio is generated by aligning the start playing time of the first, second, and third tracks respectively with the beat occurrence times of the first beat, the second beat, and the third beat in the first metronome data.

Since the target audio includes three different audio tracks, when playing the target audio, it is only necessary to play different audio tracks to achieve the purpose of playing different background music. Therefore, the present disclosure only needs one target audio to achieve the playback of multiple background music without storing multiple pieces of music in advance, thereby making the storage space occupied by the electronic game smaller.

In some embodiments of the present disclosure, the first obtaining module 710 may include: a first determining unit, configured to determine a second rhythm corresponding to the target game scene in a preset first rhythm based on a first correspondence and the target game scene; a first obtaining unit, configured to obtain the target rhythm in the second rhythm, in which the first rhythm includes at least one second rhythm; a second determining unit, configured to determine a second verse melody corresponding to the target game scene in the preset first verse melody based on a second correspondence and the target game scene and/or the data of behavior state of the player character; a second obtaining unit, configured to obtain the target verse melody in the second verse melody, in which the first verse melody includes at least one second verse melody; a third determining unit, configured to determine the second chorus melody corresponding to the target game scene in the preset first chorus melody based on a third correspondence and the target game scene and/or the data of behavior state of the player character; a third obtaining unit, configured to obtain the target chorus melody in the second chorus melody, in which the first chorus melody includes at least one second chorus melody, in which the first correspondence is the correspondence between the game scene and the rhythm data, the second correspondence is the correspondence between a verse melody and at least one of a game scene and data of behavior state of a player character, and the third correspondence is the correspondence between a chorus melody and at least one of the game scene and the data of behavior state of the player character.

In some embodiments of the present disclosure, the first audio track includes at least one rhythm segment, the second audio track includes at least one verse melody segment, and the third audio track includes at least one chorus melody segment; and the first beat includes at least one sub-beat, the second beat includes at least one sub-beat, and the third beat includes at least one sub-beat.

The alignment module 730 may include: a first alignment unit, configured to align a start playing time of each rhythm segment in the first audio track with an occurrence time of each sub-beat in the first beat; a second aligning unit, configured to align the start playing time of each verse melody segment in the second audio track with the occurrence time of each sub-beat in the second beat; a third alignment unit, configured to align the start playing time of each chorus melody segment in the third audio track with the occurrence time of each sub-beat in the third beat; a first generating unit, configured to generate the target audio based on the aligned first audio track, second audio track, and third audio track.

In some embodiments of the present disclosure, the first audio track includes at least one rhythm segment, the second audio track includes at least one verse melody segment, and the third audio track includes at least one chorus melody segment; and the first beat includes at least one sub-beat, the second beat includes at least one sub-beat, and the third beat includes at least one sub-beat.

The alignment module 730 may include: a fourth alignment unit, configured to aligning a start rhythm segment in the first audio track with the beat occurrence time of a start sub-beat in the first beat; a fifth alignment unit, configured to align the beat occurrence time of the start verse melody segment in the second track with the beat occurrence time of the start sub-beat in the second beat; a sixth alignment unit, configured to align the beat occurrence time of the start chorus melody segment in the third track with the beat occurrence time of the start sub-beat in the third beat; a second generating unit is configured to generate the target audio based on the aligned first audio track, second audio track, and third audio track.

In some embodiments of the present disclosure, the device 700 further includes: a second obtaining module, configured to separately obtain actual playing time of the first audio track, the second audio track, and the third audio track in the target audio during the process of playing the target audio; a first adjustment module, configured to adjust the first reference time in the first metronome data to the actual playing time in a case that a difference between the actual playing time of the first audio track, the second audio track, or the third audio track and its aligned beat occurrence time is greater than a preset threshold; a second adjustment module, configured to adjust the occurrence time of the target beat based on the adjusted first reference time and the first offset. The target beat is the beat that occurs after the actual playing time in the first metronome data.

In some embodiments of the present disclosure, the device 700 may further include: a third obtaining module, configured to obtain first target data of behavior state of the player character after the start playing time of the first audio track, the second audio track, and the third audio track are aligned with the beat occurrence times of the first beat, the second beat, and the third beat in the first metronome data respectively and the target audio is generated; a third adjustment module, configured to adjust the first offset based on the first target data of behavior state and the fourth correspondence, in which the fourth correspondence is the correspondence between the data of behavior state of the player character and the offset.

In some embodiments of the present disclosure, the target verse melody and the target chorus melody correspond to the target game scene and the data of behavior state of the player character.

The device 700 may further include: a fourth obtaining module, configured to obtain the second target data of behavior state and the game scene of the player character in the process of playing the target audio after the start playing time of the first audio track, the second audio track, and the third audio track are aligned with the beat occurrence times of the first beat, the second beat, and the third beat in the first metronome data respectively to generate the target audio; a switching module, configured to switch playing the target chorus melody to the verse melody when the game scene is the target game scene and the second target data of behavior state meets the preset state.

In some embodiments of the present disclosure, the device 700 may further include: a receiving module, configured to receive an uploaded target music; a recognition module, configured to recognize of the second beat data corresponding to the target music; a control module, configured to control the target object in the target game scene to execute the target action based on the occurrence time of each beat in the second beat data, in which, the second beat data includes a second offset, and the occurrence time of each beat in the second metronome data is determined based on the second reference time and the second offset.

Figure 8:
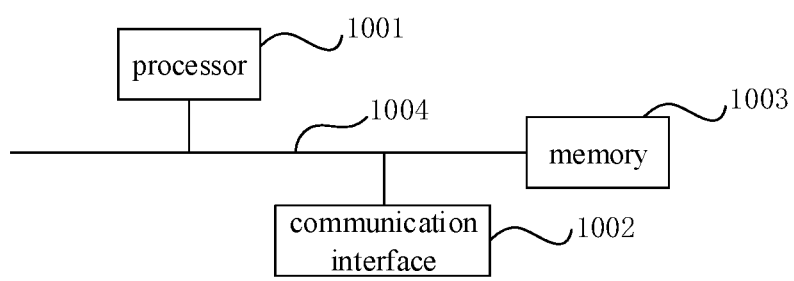
FIG. 8 is a block diagram showing a server according to an exemplary embodiment.

FIG. 8 is a block diagram showing a server according to an exemplary embodiment. Referring to FIG. 8, embodiments of the present disclosure also provide a server, including a processor 1001, a communication interface 1002, a memory 1003, and a communication bus 1004. The processor 1001, the communication interface 1002, and the memory 1003 communicate with each other through the communication bus 1004.

The memory 1003 is used to store instructions executable by the processor 1001.

When the instructions stored in the memory 1003 are executed, the processor 1001 is caused to implement the following steps: obtaining a target rhythm, a target verse melody, and a target chorus melody, in which the target rhythm corresponds to the target game scene, and the target verse melody and the target chorus melody correspond to the target game scene and/or the data of behavior state of the player character respectively; configuring the target rhythm as a first audio track, the target verse melody as a second audio track, and the target chorus melody as a third audio track; generating the target audio by aligning start playing time of the first audio track, the second audio track and the third audio track to beat occurrence times of a first beat, a second beat and a third beat in first metronome data respectively, in which the first metronome data includes a first offset, and the occurrence time of each beat in the first metronome data is determined based on the first reference time and the first offset.

In the embodiment of the present disclosure, the target rhythm corresponding to the target game scene and the target verse melody and target chorus melody corresponding to the target game scene and/or the data of behavior state of the player character are first acquired, and then the target rhythm and target verse melody and the target chorus melody are configured as different audio tracks, and the first, second, and third audio tracks are obtained; finally, the target audio is generated by aligning start playing time of the first audio track, the second audio track and the third audio track to beat occurrence times of a first beat, a second beat and a third beat in first metronome data respectively.

Since the target audio includes three different audio tracks, when the target audio is played, it is only necessary to play different audio tracks to achieve the purpose of playing different background music. Therefore, the present disclosure only needs one target audio to achieve playing of background music without storing multiple pieces of music in advance, thereby making the storage space occupied by the electronic game smaller.

Figure 9:
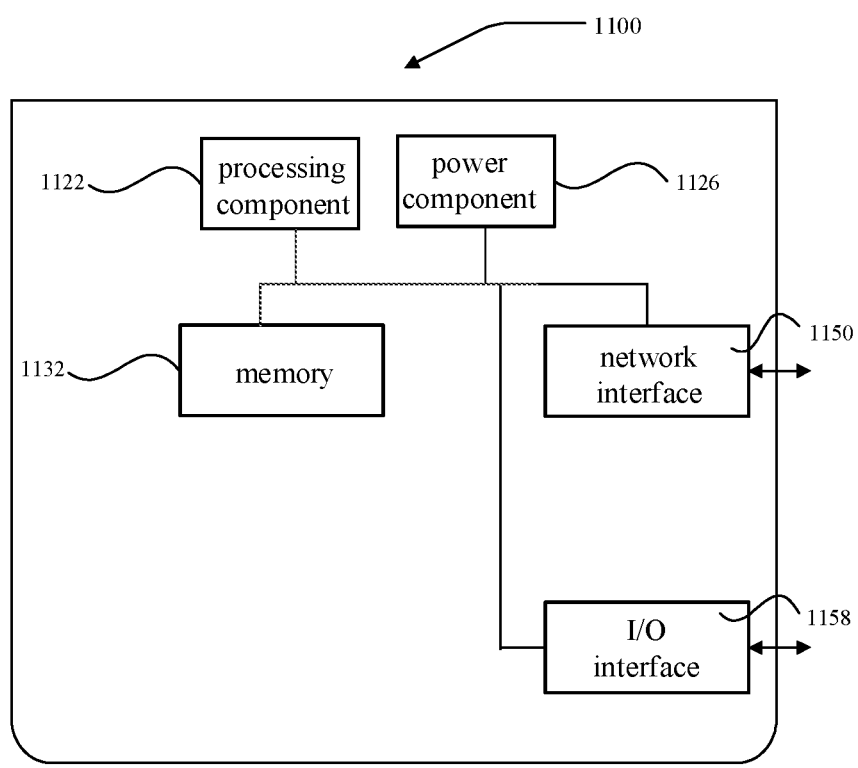
FIG. 9 is a block diagram showing a device for a method for audio generation according to an exemplary embodiment.

FIG. 9 is a block diagram showing a device for a method for audio generation according to an exemplary embodiment. For example, the device 1100 may be provided as a server. Referring to FIG. 9, the server 1100 includes a processing component 1122, which further includes one or more processors, and a memory resource represented by a memory 1132, for storing instructions that can be executed by the processing component 1122, such as application programs. The application program stored in the memory 1132 may include one or more modules each corresponding to a set of instructions. In addition, the processing component 1122 is configured to execute instructions to execute a method for audio generation described in any of the foregoing embodiments.

The device 1100 may also include a power component 1126 configured to perform power management of the device 1100, a wired or wireless network interface 1150 configured to connect the device 1100 to a network, and an input output (I/O) interface 1158. The device 1100 can operate based on an operating system stored in the memory 1132, such as Windows Server™, MacOS X™, Unix™, Linux™, FreeBSD™ or the like.

In some embodiments of the present disclosure, a storage medium is also provided. When the instructions in the storage medium are executed by the processor of the server, the server can execute a method for audio generation described in any of the foregoing embodiments.

Optionally, the storage medium may be a non-transitory computer-readable storage medium. Illustratively, the non-transitory computer-readable storage medium may be ROM, random access memory (RAM), CD-ROM, magnetic tape, floppy disk, and optical data. Storage equipment, etc.

In some embodiments of the present disclosure, a computer program product is also provided. When the instructions in the computer program product are executed by the processor of the server, the server can execute a method for audio generation described in any of the foregoing embodiments.

Other embodiments of the present disclosure will be apparent to those skilled in the art from consideration of the specification and practice of the present disclosure disclosed here. This application is intended to cover any variations, uses, or adaptations of the present disclosure following the general principles thereof and including such departures from the present disclosure as come within known or customary practice in the art. It is intended that the specification and examples be considered as exemplary only, with a true scope and spirit of the present disclosure being indicated by the following claims.

It will be appreciated that the present disclosure is not limited to the exact construction that has been described above and illustrated in the accompanying drawings, and that various modifications and changes may be made without departing from the scope of the present disclosure. It is intended that the scope of the present disclosure only be limited by the attached claims.

What is claimed is:

1. A method for audio generation, comprising:
obtaining a target rhythm, a target verse melody and a target chorus melody, wherein the target rhythm is corresponding to a target game scene, and the target verse melody and the target chorus melody are respectively corresponding to at least one of the target game scene and data of behavior state of a player character;
configuring the target rhythm as a first audio track, the target verse melody as a second audio track, and the target chorus melody as a third audio track;
generating a target audio by aligning start playing time of the first audio track, the second audio track and the third audio track to beat occurrence time of a first beat, a second beat and a third beat in a first metronome data respectively, wherein the first metronome data comprises a first offset, and occurrence time of each beat in the first metronome data is determined based on a first reference time and the first offset.

2. The method of claim 1, wherein obtaining the target rhythm, the target verse melody and target chorus melody comprises:
determining a second rhythm corresponding to the target game scene from a preset first rhythm based on a first correspondence and the target game scene, and obtaining the target rhythm in the second rhythm, wherein the first rhythm comprises at least one second rhythm, and the first correspondence is a correspondence between a game scene and rhythm data;
determining a second verse melody corresponding to the target game scene from a preset first verse melody based on a second correspondence and at least one of the target game scene and the data of behavior state of the player character, and obtaining the target verse melody in the second verse melody, wherein the first verse melody comprises at least one second verse melody, and the second correspondence is a correspondence between a verse melody and at least one of a game scene and data of behavior state of a player character;
determining a second chorus melody corresponding to the target game scene from a preset first chorus melody based on a third correspondence and at least one of the target game scene and the data of behavior state of the player character, and obtaining the target chorus melody in the second chorus melody, wherein the first chorus melody comprises at least one second chorus melody, and the third correspondence is a correspondence between a chorus melody and at least one of the game scene and the data of behavior state of the player character.

3. The method of claim 1, wherein the first audio track comprises at least one rhythm segment, the second audio track comprises at least one verse melody segment, and the third audio track comprises at least one chorus melody segment; the first beat comprises at least one sub-beat, the second beat comprises at least one sub-beat, and the third beat comprises at least one sub-beat.

4. The method of claim 3, wherein said generating the target audio by aligning the start playing time of the first audio track, the second audio track and the third audio track to the beat occurrence time of a first beat, a second beat and a third beat in first metronome data respectively, comprises:

aligning a start playing time of each rhythm segment in the first audio track to an occurrence time of each sub-beat in the first beat respectively;

aligning a start playing time of each verse melody segment in the second audio track to an occurrence time of each sub-beat in the second beat;

aligning a start playing time of each chorus melody segment in the third track to an occurrence time of each sub-beat in the third beat; and generating the target audio based on the aligned first audio track, the second audio track, and the third audio track.

5. The method of claim 3, wherein said generating the target audio by aligning the start playing time of the first audio track, the second audio track and the third audio track to the beat occurrence time of a first beat, a second beat and a third beat in a first metronome data respectively, comprises:

aligning a start rhythm segment in the first audio track to beat occurrence time of a start sub-beat in the first beat;

aligning a start verse melody segment in the second audio track to beat occurrence time of a start sub-beat in the second beat;

aligning a start chorus melody segment in the third audio track to beat occurrence time of a start sub-beat in the third beat; and generating the target audio based on the aligned first audio track, the second audio track, and the third audio track.

6. The method of claim 1, further comprising:

obtaining actual playing time of the first audio track, the second audio track, and the third audio track in the target audio respectively during playing the target audio;

adjusting the first reference time in the first metronome data to the actual playing time, in a case that a difference between the actual playing time of the first audio track, the second audio track, or the third audio track and an aligned beat occurrence time thereof is greater than a preset threshold, and adjusting an occurrence time of a target beat based on the adjusted first reference time and the first offset, wherein, the target beat is a beat that occurs after the actual playing time in the first metronome data.

7. The method of claim 1, further comprising:

obtaining first target data of behavior state of the player character;

adjusting the first offset based on the first target data and a fourth correspondence, wherein the fourth correspondence is a correspondence between data of behavior state of a player character and an offset.

8. The method of claim 1, wherein the target verse melody and the target chorus melody are corresponding to the target game scene and the data of behavior state of the player character;

the method further comprises:

obtaining a second target data of behavior state of the player character and a game scene during playing the target audio;

switching playing the target chorus melody to playing a verse melody in a case that the game scene is the target game scene and the second target data meets the preset state.

9. The method of claim 1, further comprising:

receiving a piece of music uploaded;

identifying a second beat data corresponding to the music;

controlling the target object in the target game scene to execute a target action based on an occurrence time of each beat in the second beat data, wherein the second beat data comprises a second offset, and an occurrence time of each beat in the second metronome data is determined based on a second reference time and the second offset.

10. A device for audio generation, comprising:

a processor;

a memory for storing executable instructions of the processor;

wherein, the processor is configured to performing acts of:

obtaining a target rhythm, a target verse melody and a target chorus melody, wherein the target rhythm is corresponding to a target game scene, and the target verse melody and the target chorus melody are respectively corresponding to at least one of the target game scene and data of behavior state of a player character;

configuring the target rhythm as a first audio track, the target verse melody as a second audio track, and the target chorus melody as a third audio track;

generating a target audio by aligning start playing time of the first audio track, the second audio track and the third audio track to beat occurrence time of a first beat, a second beat and a third beat in a first metronome data respectively, wherein the first metronome data comprises a first offset, and occurrence time of each beat in the first metronome data is determined based on a first reference time and the first offset.

11. The apparatus of claim 10, wherein the processor is configured to performing acts of:

determining a second rhythm corresponding to the target game scene from a preset first rhythm based on a first correspondence and the target game scene, and obtaining the target rhythm in the second rhythm, wherein the first rhythm comprises at least one second rhythm, and the first correspondence is a correspondence between a game scene and rhythm data;

determining a second verse melody corresponding to the target game scene from a preset first verse melody based on a second correspondence and at least one of the target game scene and the data of behavior state of the player character, and obtaining the target verse melody in the second verse melody, wherein the first verse melody comprises at least one second verse melody, and the second correspondence is a correspondence between a verse melody and at least one of a game scene and data of behavior state of a player character;

determining a second chorus melody corresponding to the target game scene from a preset first chorus melody based on a third correspondence and at least one of the target game scene and the data of behavior state of the player character, and obtaining the target chorus melody in the second chorus melody, wherein the first chorus melody comprises at least one second chorus melody, and the third correspondence is a correspondence between a chorus melody and at least one of the game scene and the data of behavior state of the player character.

12. The apparatus of claim 10, wherein the first audio track comprises at least one rhythm segment, the second audio track comprises at least one verse melody segment, and the third audio track comprises at least one chorus melody segment; the first beat comprises at least one sub-beat, the second beat comprises at least one sub-beat, and the third beat comprises at least one sub-beat.

13. The apparatus of claim 12, wherein the processor is configured to performing acts of:
aligning a start playing time of each rhythm segment in the first audio track to an occurrence time of each sub-beat in the first beat respectively;
aligning a start playing time of each verse melody segment in the second audio track to an occurrence time of each sub-beat in the second beat;
aligning a start playing time of each chorus melody segment in the third track to an occurrence time of each sub-beat in the third beat; and
generating the target audio based on the aligned first audio track, the second audio track, and the third audio track.

14. The apparatus of claim 12, wherein the processor is configured to performing acts of:
aligning a start rhythm segment in the first audio track to beat occurrence time of a start sub-beat in the first beat;
aligning a start verse melody segment in the second audio track to beat occurrence time of a start sub-beat in the second beat;
aligning a start chorus melody segment in the third audio track to beat occurrence time of a start sub-beat in the third beat;
generating the target audio based on the aligned first audio track, the second audio track, and the third audio track.

15. The apparatus of claim 10, wherein the processor is configured to performing acts of:
obtaining actual playing time of the first audio track, the second audio track, and the third audio track in the target audio respectively during playing the target audio;
adjusting the first reference time in the first metronome data to the actual playing time in a case that a difference between the actual playing time of the first audio track, the second audio track, or the third audio track and an aligned beat occurrence time thereof is greater than a preset threshold, and adjusting an occurrence time of a target beat based on the adjusted first reference time and the first offset,
wherein, the target beat is a beat that occurs after the actual playing time in the first metronome data.

16. The apparatus of claim 10, wherein the processor is configured to performing acts of:
obtaining first target data of behavior state of the player character;
adjusting the first offset based on the first target data and a fourth correspondence,
wherein the fourth correspondence is a correspondence between data of behavior state of a player character and an offset.

17. The apparatus of claim 10, wherein the target verse melody and the target chorus melody are corresponding to the target game scene and the data of behavior state of the player character;
the processor is configured to performing acts of:
obtaining a second target data of behavior state of the player character and a game scene during playing the target audio;
switching playing the target chorus melody to playing a verse melody in a case that the game scene is the target game scene and the second target data of behavior state meets the preset state.

18. The apparatus of claim 10, wherein the processor is configured to performing acts of:
receiving a piece of music uploaded;
identifying a second beat data corresponding to the music;
controlling the target object in the target game scene to execute a target action based on an occurrence time of each beat in the second beat data,
wherein the second beat data comprises a second offset, and an occurrence time of each beat in the second metronome data is determined based on a second reference time and the second offset.

19. A non-transitory computer-readable storage medium having instructions stored thereon, wherein when instructions are executed by a processor of a server, the server is caused to execute a method for audio generation, and the method comprises:
obtaining a target rhythm, a target verse melody and a target chorus melody, wherein the target rhythm is corresponding to a target game scene, and the target verse melody and the target chorus melody are respectively corresponding to at least one of the target game scene and data of behavior state of a player character;
configuring the target rhythm as a first audio track, the target verse melody as a second audio track, and the target chorus melody as a third audio track;
generating a target audio by aligning start playing time of the first audio track, the second audio track and the third audio track to beat occurrence time of a first beat, a second beat and a third beat in a first metronome data respectively, wherein the first metronome data comprises a first offset, and occurrence time of each beat in the first metronome data is determined based on a first reference time and the first offset.

20. The storage medium of claim 19, wherein obtaining the target rhythm, the target verse melody and target chorus melody comprises:
determining a second rhythm corresponding to the target game scene from a preset first rhythm based on a first correspondence and the target game scene, and obtaining the target rhythm in the second rhythm, wherein the first rhythm comprises at least one second rhythm, and the first correspondence is a correspondence between a game scene and rhythm data;
determining a second verse melody corresponding to the target game scene from a preset first verse melody based on a second correspondence and at least one of the target game scene and the data of behavior state of the player character, and obtaining the target verse melody in the second verse melody, wherein the first verse melody comprises at least one second verse melody, and the second correspondence is a correspondence between a verse melody and at least one of a game scene and data of behavior state of a player character; and
determining a second chorus melody corresponding to the target game scene from a preset first chorus melody based on a third correspondence and at least one of the target game scene and the data of behavior state of the player character, and obtaining the target chorus melody in the second chorus melody, wherein the first chorus melody comprises at least one second chorus melody, and the third correspondence is a correspondence between a chorus melody and at least one of the game scene and the data of behavior state of the player character.

\* \* \* \* \*